Jan. 14, 1969     K. GREIS     3,421,395

DEVICE FOR EDGE TRIMMING METAL SHEET MATERIAL IN SHEARING LINES

Filed Nov. 23, 1966

# United States Patent Office 3,421,395
Patented Jan. 14, 1969

3,421,395
DEVICE FOR EDGE TRIMMING METAL SHEET MATERIAL IN SHEARING LINES
Karl Greis, St. Ingbert (Saar), Germany, assignor to Moeller & Neumann G.m.b.H., Ingbert (Saar), Germany
Filed Nov. 23, 1966, Ser. No. 596,643
Claims priority, application Germany, Nov. 26, 1965, Reg. No. (utility model) V 18,295
U.S. Cl. 83—436
Int. Cl. B26d 5/38; B26d 9/00

1 Claim

ABSTRACT OF THE DISCLOSURE

A device for double edge trimming of metal sheets comprising two trimming shears disposed on opposite sides of a roller table and supported on base plates for sheet trimming width adjustment transversely of the roller table between a trimming width greater than the roller table width and a trimming width less than the roller table width after removal of a roller table section.

---

The invention relates to a device for edge trimming metal sheets in shearing lines of a rolling mill on opposite sides simultaneously and consists of two edge trimming shears disposed opposite each other on both sides of a roller table. The shears have straight knives which are both mounted on base plates, at least one of the shears being mounted on its base plate for variable positioning transversely of the roller table to adjust the trimming width.

This type of edge trimming devices with oppositely disposed shears have the advantage that, with respect to conventional shearing lines incorporating edge trimming shears which are staggered along the roller table, they provide a saving in the length of the required work area and in the amount of operating personnel, as well as eliminating the marking and the double adjusting of the sheets in front of the shears, and close tolerances in the trimming width may be maintained.

The invention solves the problem of building an edge trimming device of this type into an existing shearing line without requiring an extended interruption of the operation at the shearing line. The assembly as well as the installation of the electrical devices for this type of heavy shears, especially edge trimming shears for thick sheets or plates, takes usually several months. It is conceivable to assemble the shears adjacent the shearing line and to transfer them subsequently into the operative position on the previously installed base plate, but generally the lifting cranes available are not capable of transferring the heavy shears.

It is a basic principle of the invention to use the already present base plates of the edge trimming shears to help solve the problem of installing the shears, and its solution consists in that the base plates of both shears are extended outwardly to the point where for the subsequent installation of the two shears into the shearing line the shears can be mounted outside of the width of the roller table and may be moved into the operating position after removing the roller table section located between them.

Additional features and advantages of the invention will appear from the following description in conjunction with the accompanying drawings showing an embodiment of the novel edge trimming shears, and in which.

Figure 1:
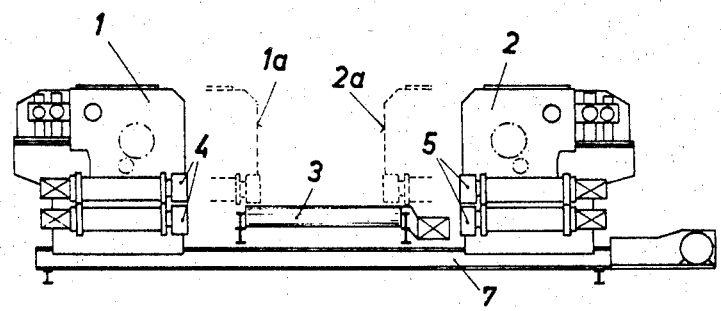
FIGURE 1 shows so-called double side edge trimming shears in a side view.

In referring to the drawing it will be seen that two heavy guillotine-type edge trimming shears 1 and 2 are mounted in opposite arrangement on both sides of a roller table having a plurality of rollers 3. For trimming sheets of maximum sheet width the shears would have to be located in the operating position 1a or 2a, as indicated in the dash line position showing the front parts of the shears in FIGURE 1. In this illustration the lower drive rollers of the driving roller pairs 4 and 5 of the two shears have not been shown for purpose of clarity.

If the two shears 1 and 2 were mounted in the operating position 1a or 2a it would be necessary to remove the roller table section between the shears, and this would necessitate interruption of the cutting operation on the entire shearing line.

In order to avoid this the base plates 6 and 7 are extended outwardly so far that the two trimming shears 1 and 2 may be mounted in the solid line position. The base plates 6 and 7 must be installed previously together with a suitable foundation (not shown) under the roller table with the rollers 3, and for this operation it may be necessary to reinforce the support frame of the roller table in the area of the earth to be removed for the foundation by a cross-beam or the like. However, all this work may be carried out without substantially interfering with the continuous operation with the existing shearing line.

Figure 2:
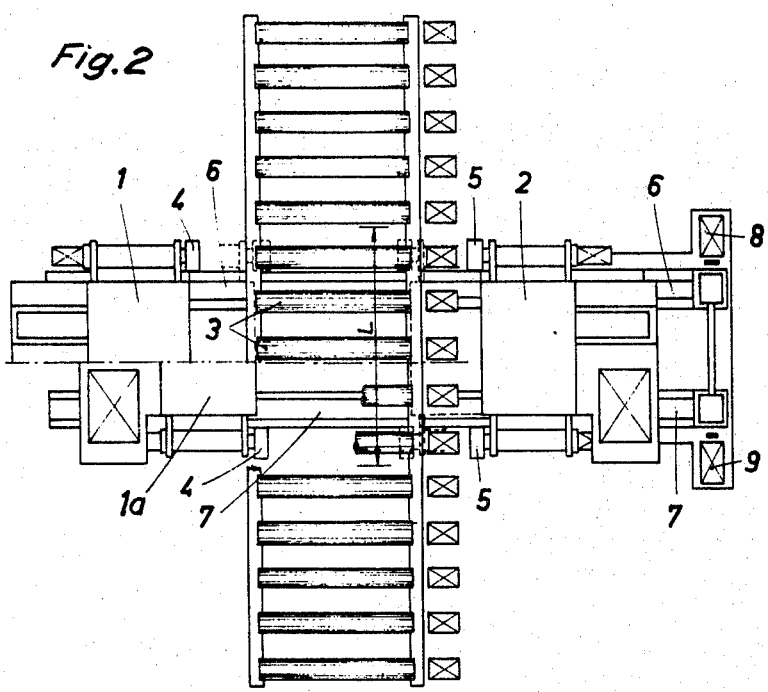
FIGURE 2 shows a plan view of the edge trimming shears according to FIGURE 1, and a portion of the shearing line.

With particular reference to FIGURE 2 it may be seen that of the two shears 1 and 2 mounted in the assembly position the shears 2 are those which may be adjusted by a motor drive 8, 9, over horizontal spindles not shown in detail, transversely to the roller table in order to select each time the desired trimming width relative to the shears 1 which are stationary in operation. Within the scope of the invention the adjusting range of the spindles is so wide that the shears 2 may be moved, after the mounting of an electrical installation has been completed and after a section of the table having a length L has been taken out, into the dash line operating position and may be moved beyond this to adjust the minimum trimming width. The shears 1 which are stationary during operation are moved ahead in any other appropriate manner, for example by repeated actuation of a hydraulic lifting jack, into the stationary operating position 1' shown in the lower part of FIGURE 2, where the shears 1 are clamped into position on their base plates 6 and 7. Since the shears have already been test run in the assembly position the cutting operation may continue for practical purposes right after the required roller table section has been removed and the shears have been advanced into their permanent position.

It is naturally within the scope of the invention to provide motor power for moving the shears 1 on the base plates 6 and 7. Furthermore, it is not absolutely required that the base plates shown in FIGURE 1 for example, are continuous from one side to the other in pairs. They need only extend on the one hand in a known manner so far inwardly as it is necessary for adjusting the minimum trimming width, but on the other hand must extend according to the invention so far outwardly that the shears 1, 2 may be mounted outside the roller table in the assembly position.

What I claim is:
1. Device for double edge trimming of sheets in shearing lines consisting of two trimming shears with straight knives disposed opposite each other on both sides of a roller table and resting both on base plates, at least one of said shears being mounted on their base plates for adjustment of the trimming width transversely of the roller table of the shearing line, characterized in that the base plates (6), (7) of both shears (1), (2) are extended outwardly so far that for the subsequent installation of the two opposite shears into an existing shearing line the shears may be mounted outside the width of the roller table and may be advanced after removal of a roller table section (L) lying between them into their operating positions (1a, 2a).

References Cited

UNITED STATES PATENTS

| 1,193,020 | 8/1916 | Irwin | 83—517 X |
| 3,246,552 | 4/1966 | Sieger | 83—556 X |
| 3,359,845 | 12/1967 | Greis et al. | 83—556 |

ANDREW R. JUHASZ, *Primary Examiner.*

F. T. YOST, *Assistant Examiner.*

U.S. Cl. X.R.

83—517, 560